Patented Jan. 1, 1935

1,985,885

UNITED STATES PATENT OFFICE 1,985,885

PREPARATION OF 1,3 DIAMINO-2-PROPANOL

Robert Roger Bottoms, Louisville, Ky., assignor to The Girdler Corporation, Louisville, Ky., a corporation of Delaware No Drawing. Application November 23, 1931, Serial No. 576,952

3 Claims. (Cl. 260—127)

In my patents No. 1,783,901, dated December 2, 1930 and No. 1,834,016, dated December 1, 1931, I have disclosed processes of separating acidic gases, such as carbon dioxide and/or hydrogen sulfide, from gaseous mixtures commonly encountered in industrial operations, in which gaseous mixtures, said gases occur either as impurities or as valuable products to be recovered.

I have discovered that certain amino alcohols of relatively high nitrogen content have certain important advantages over any of the compounds mentioned in my patents above referred to, but so far as I have been able to discover, no satisfactory process has heretofore been developed, whereby such alcohols may be made economically and in a comparatively pure state.

It has been found that organic nitrogen compounds of a basic nature containing more than 25% of nitrogen and particularly organic compounds containing a plurality of amino groups with other basic groups such as the hydroxyl group, are particularly adapted for gaseous treatment reactions of the character described. These compounds are more efficient per unit volume and they permit of substantially complete absorption and recovery of the acidic gases with smaller temperature differences between the absorption and the recovery steps. Particularly suitable compounds of this character are diaminohydroxyl aliphatic compounds, such as normal diamino propanol.

The main object of my invention is to provide a process for the preparation of amino alcohols from relatively inexpensive and readily procurable raw materials, with substantially theoretical yields, and without the formation of large quantities of secondary and tertiary amines and other impurities from side reactions.

In accomplishing this object it has been found that when chlorine or other halogen derivatives of the alcohol are treated with aqueous or other solutions containing large excess of ammonia or its derivatives in the presence of a fixed alkali, the chlorine or halogen of the organic compound is replaced by an amino group with the resulting formation of a primary amine. The amine thus formed is not only in a high state of purity, but substantially theoretical yields thereof are obtained, the secondary and tertiary reactions of the amino compounds first formed with the chlorine or halogen compounds apparently not taking place at all or taking place to a practically negligible extent.

Amino alcohols have been made heretofore through the action of aqueous ammonia and chlorhydrins. By the processes heretofore employed, these amino alcohols have been produced in a low state of purity. Diamino-propanol has been produced by Fairbourne and others (Journal of the Society of Chemical Industry, December 19, 1930, page 1069). The amines produced by the method therein disclosed contain a maximum of 22% nitrogen, and in the form of a thick, hard, non-distillable gel, while the diaminopropanol made by my process contains about 30% nitrogen, is crystalline, and almost completely distillable.

In one embodiment of the invention chlorhydrin or epichlorhydrin or other halogenated hydroxyl derivatives are treated with an aqueous solution of ammonia containing a fixed alkali, said ammonia being employed in quantity many times, for example 5 to 10 times, the theoretical amount necessary to form the amino derivative desired. Aqueous ammonia solutions varying from 20% up may be conveniently employed. The aqueous ammonia solution must contain sufficient quantity of the hydroxide of an alkali metal, or an alkali earth metal to combine theoretically with the chlorine and form a soluble inorganic salt, the most available alkali for this purpose being caustic soda.

By using a large excess of ammonia and a fixed alkali, the production of secondary and tertiary amines is almost entirely prevented. The excess ammonia and the amount of free alkali are such that the pH of the solution is maintained at a point above 12. The theoretical amount of fixed alkali should be used for combining with the chlorine liberated from the chlorhydrin, and by maintaining the pH of the solution above 12 primary amino alcohols may be produced with an accompanying production of less than 12% of secondary and tertiary amines.

The resulting mixture formed containing the inorganic salt, for example sodium chloride, and the amino derivative may be evaporated to remove large quantities of the salt by crystallization, and then finally treated with ethyl alcohol to remove the residual salt. The residual amino compound is in a high state of purity and may be used directly upon the addition of water for the absorption of acidic gases from gas mixtures.

As a specific example of one method of preparing the high nitrogen content amino derivative, specifically 1.3-diamino-2-propanol, the following method may be employed:

One mol. of glycerol dichlorhydrin (129 grams) is passed into or added to two liters of ammonia solution cooled to 30° C. or lower and containing 20% or more of $NH_3$ and two mols of NaOH (80 grams). This mixture is then stirred for 15 to 20 minutes until the reaction is complete, and then the ammonia and excess water are distilled off. Boiling is continued until a large amount of the sodium chloride formed has crystallized.

When the crystals of sodium chloride collect to a point where they interfere with the boiling, the solution is removed and the separated crystals filtered off. Boiling is then resumed and the sodium chloride is crystallized until it collects to a point where it again begins to interfere with the boiling, whereupon the solution is again filtered. Practically all the salt can then be removed by crystallization upon boiling under a vacuum of about 15 to 25 mm., the evaporation being carried out until the temperature of the mixture reaches about 100° C. at which time the sodium chloride and diamine mixture resulting will be practically anhydrous.

This mixture, while still hot, is then taken up into about two or three times its volume of either methyl or ethyl alcohol (ordinary 95% grade) or isopropyl alcohol, and most of the residual sodium chloride will be precipitated. The precipitate is then filtered away and the alcohol distilled off and recovered. After most of the alcohol has been distilled off, the distillation is continued under a vacuum of about 15 to 25 mm. until the temperature of the mixture reaches about 100° C.

The pure product which may be obtained by distillation of the above crude product under reduced pressure, is a white crystalline solid melting at 42° C. and boiling at about 235° C. and is readily soluble in water in all proportions to form a slightly viscous solution which has a boiling point slightly above 100° C. The distillation will separate the pure product from the final portion of the residual salt and from such polymers as may have been produced.

It is desirable to maintain the ratio of the volume of liquid to chlorhydrin during the reaction of at least as high as given above, namely, two liters per gram mol. of chlorhydrin. A larger proportion of water makes a slightly better product, but the product made as above outlined is entirely satisfactory. It is important to mix the caustic soda or other alkali into the ammonia solution prior to adding the chlorhydrin. The chlorhydrin may be dumped in all at once, or run in slowly provided the liquid is under active agitation at the time the chlorhydrin is added. Clarification by means of activated charcoal may by employed to give the diamine a somewhat better appearance.

In the method of manufacture as set forth in the above example, the following equations are thought to represent the approximate course of the reaction when dichlorhydrin is used:

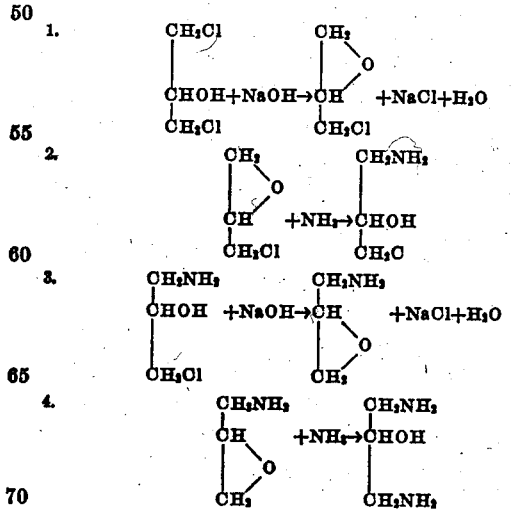

The first reaction that takes place probably is one between the chlorhydrin and the caustic soda in which one chlorine atom is removed with the formation of epichlorhydrin. This immediately reacts with a molecule of ammonia forming a glyceryl aminochlorhydrin, which immediately reacts with caustic soda forming sodium chloride, releasing water and producing epiaminohydrin. The epiaminohydrin immediately reacts with a further quantity of ammonia producing the diaminopropanol. This reaction with the intermediate formation of epihydrins makes it necessary to have ammonia present in large excess in order to prevent the amino derivatives which are first formed from reacting with further quantities of the chlorhydrin and producing undesirable secondary and tertiary reaction products and other complex polymers.

In the above reaction the ammonia may be replaced in part or whole by ammonia substitution products in which one or more of the hydrogen atoms have been replaced by alkyl aryl or other organic radicals. Other materials than dichlorhydrins, such as glyceromonochlorhydrins, epichlorhydrins, ethylenechlorhydrins and other halohydrins, may be utilized as starting materials to produce the corresponding amino derivatives. Instead of caustic soda, alkali metal carbonates, or alkali earth metal hydroxides, such as those of barium and calcium, may be employed. In all cases the ammonia or its equivalents is preferably used in amounts equivalent to five times or more of that required for the theoretical reaction.

As another example, piperidyl ethanol may be prepared in the following manner. One mol. of ethylene chlorhydrin may be added to an aqueous solution of piperidine and alcohol containing one mol. of piperidine and one mol. of NaOH which has been previously cooled to 5–10° C. The resulting mixture is stirred until the reaction is complete. Thereupon the excess water is evaporated as before described, and the residual salt separated by dissolving the free base in alcohol, filtering and distilling off the alcohol. Other similar heterocyclic nitrogen compounds may also be employed instead of piperidine.

In common with the absorbents disclosed in my prior patent and application, 1.3-diamino-2-propanol and other equivalent high nitrogen content basic organic derivatives (which derivatives should preferably be free of carbonyl (CO) and carboxyl (COOH) groups), have the properties of being readily soluble in water or other liquids which do not form stable compounds with the gases to be absorbed and which have a boiling point not below the temperature of effective gas elimination; of chemically uniting with acidic gases at a comparatively low temperature range, giving up the gas in gaseous form at a high temperature and at the same time becoming regenerated; and of having a low vapor pressure during the absorption stage and also during the heating or gas liberating stage.

These properties permit the absorption agents in liquid form to be circulated continuously in a closed cycle through the low temperature absorption and higher temperature regeneration stage, with comparatively slight loss of the absorbent agent, ensure long life for the absorbent agent in circulation, enable minimizing of heat consumption through the use of heat interchangers, and the treatment of large volumes of gases for comparatively small volumes of the absorbent.

Also diaminopropanol is not caustic, and therefore is not harmful to use, and may be employed in processing equipment of ordinary materials. It does not react with other gases ordinarily present in the industrial gases to be treated, has no objectionable odor, and does not impart any odor to the gases separated under the temperature and pressure of use.

The 1,3-diamino-2-propanol will effect substantially complete removal or recovery of the carbon dioxide, or hydrogen sulfide, which may be regenerated at a comparatively high rate with minimum loss at steam temperature, and during regeneration it gives up all or substantially all of the absorbed gas or gases. The compounds which are formed with the acidic gases are comparatively stable at the absorption temperature, but the instability increases as the temperature rises, the greater part of the acidic gas being driven off at the boiling temperature of the liquid.

The 1,3-diaminopropanol, in addition, may be most advantageously employed as a gas absorbent since relatively weaker solutions thereof will absorb much greater quantities of the acidic gases and at high temperatures. As a result a much smaller quantity of solution of the diaminopropanol will be circulated to obtain equivalent absorptive capacity, and at much higher temperatures, for example at temperatures up to 70° C. so that when the absorbed acidic gases are liberated a smaller amount of heat is consumed in raising the temperature of the reaction mixture to the boiling point of water or to some other temperature at which the absorbed gas is preferably evolved.

For example, diaminopropanol has been found to have about three times the absorptive capacity of triethanolamine under the same conditions, a 33⅓ solution of diaminopropanol absorbing about 90 volumes of carbon dioxide under usual conditions. While it has been found advantageous to use a 30% to 35% solution of diaminopropanol commercially, any strength solution may be readily employed. However, with concentrations greater than 40 to 50% by volume, the diaminopropanol carbonate formed has a tendency to crystallize out especially if the solution is allowed to become cold and stand quietly over a period of several hours. Under these conditions, it has been found most satisfactory to use a smaller concentration.

When a 30 to 35% solution of the diaminopropanol is used instead of a 50% solution of triethanolamine, it has been found that the diaminopropanol solution will absorb as much carbon dioxide at a temperature of 70° C. (about 40 volumes of carbon dioxide per volume of liquid solution at atmospheric temperature and pressure) as would be absorbed by the 50% triethanolamine solution at 35° C. In other words, the efficiency of the process in absorbing carbon dioxide is actually increased with increasing temperature without decreasing the completeness of the removal.

When diaminopropanol is used for absorbing hydrogen sulfide it has been found that a 35% solution thereof will absorb twice as much $H_2S$ as a 50% solution of triethanolamine.

Although diaminopropanol per se is not a cyclic compound, it reacts with the water to form an isopropanol diammonium oxide which is a heterocyclic compound, with carbon, nitrogen and oxygen forming the ring.

Diaminopropanol is a solid at ordinary temperatures, and therefore it is desirable to use it in water solution. In referring to a water solution of diaminopropanol I desire to have the range so interpreted as to include any compounds which may result from the reaction of diaminopropanol with water or with any of the acidic gases which are or may be absorbed by it.

Due to the fact that diaminopropanol is a much more effective absorbent than the other absorbent previously utilized, it is possible to utilize smaller pumps, pipe lines and heat exchange apparatus. Since the difference of temperature of the absorbent solution between the absorbing and regenerating operation is much smaller than hitherto, the size of the heat interchanger may be materially reduced, or in some cases completely eliminated. This is particularly the case where the process is carried out under pressure, as for example, in the case of the absorption and recovery of carbon dioxide where the partial pressure of carbon dioxide is one atmosphere or above.

Any subject matter common to this application and to my copending application Serial No. 736,046, filed July 19, 1934, is broadly claimed in the last mentioned application.

Having thus described my invention, what I claim as new and desire to secure by Letters Patent is:

1. The process of preparing 1,3-diamino-2-propanol, which comprises adding glycerol dichlorhydrin with constant stirring to water containing over 15% of ammonia gas, at a temperature not in excess of 30° C. and also containing the theoretical amount of alkali to combine with the chlorine present in the chlorhydrin to produce an alkali metal chloride, there being a large excess of ammonia present over and above the theoretical amount required for the reaction, in the order of five to ten times that required by the reaction, the amount of water in the solution being in the ratio of approximately two liters of water per gram mol. of the chlorhydrin.

2. A process of forming 1,3-diamino-2-propanol, which includes effecting reaction of 1,3-dichlor-2-propanol with ammonia in the presence of a fixed alkali and water in a sufficient amount so that there will be at least one liter of water for each gram mol. of 1,3-dichlor-2-propanol.

3. A process of preparing 1-3-diamino-2-propanol, which includes effecting reaction of 1,3-dichlor-2-propanol with ammonia in the presence of a fixed alkali and of water in an amount equivalent to two liters per gram mol. of the 1,3-dichlor-2-propanol.

ROBERT ROGER BOTTOMS.